(No Model.)
J. D. BRUNTON & F. H. J. TRIER.
APPARATUS OR MEANS FOR TURNING OR SHAPING STONE.
No. 252,728. Patented Jan. 24, 1882.
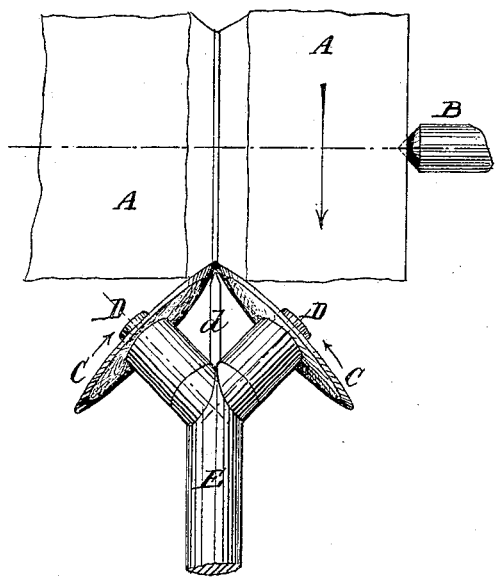
Witnesses:
Inventors.

UNITED STATES PATENT OFFICE.

JOHN D. BRUNTON AND FRANK H. J. TRIER, OF WESTMINSTER, COUNTY OF MIDDLESEX, ENGLAND.

APPARATUS OR MEANS FOR TURNING OR SHAPING STONE.

SPECIFICATION forming part of Letters Patent No. 252,728, dated January 24, 1882.

Application filed September 28, 1881. (No model.)

*To all whom it may concern:*

Be it known that we, JOHN DICKINSON BRUNTON and FRANK HENRY JULIUS TRIER, (commonly known as FRANK TRIER,) subjects of the Queen of Great Britain, and residing at 19 Great George Street, Westminster, in the county of Middlesex and Kingdom of England, have invented certain Improvements in Apparatus or Means for Turning or Shaping Stone, of which the following is a specification.

Our said invention relates to improved apparatus or means for turning or shaping stone; and it consists in an improved combination of cutters arranged as hereinafter described for the purpose of performing the operations of cutting grooves, forming internal angles or internal parts of moldings, and of roughing out.

In the accompanying drawing, which is a view in perspective, A represents the stone to be operated upon, which is mounted on suitable lathe-centers, B, one of such centers only being represented in the drawing. Two circular cutters, C, are carried upon suitable spindles, D, so as to be free to turn thereon, and are arranged in such a manner as to revolve in planes inclined to one another, and also forming an angle with the axis or with the original surface of the stone. The spindles D are carried by a suitable holder, E, capable of being moved so as to hold the cutters up to the work in the usual manner, and a scraper, *d*, is provided between the cutters for the purpose of preventing the edges from becoming clogged. The stone A revolves in the direction of the arrow marked thereon in the drawing, and the cutters C are thereby caused to revolve in the opposite direction and split or shear off the portion of the stone situated between them. By their combined action the cutters mutually assist each other in this operation, and any undue breaking away of the surface of the stone is thereby prevented, while a clean-cut groove or V-shaped recess is produced with great facility.

The combination and arrangement of cutters hereinbefore described is also applicable to cutting and shaping stone in other than turning operations—such as forming grooves or internal angles for straight or curved moldings; but this arrangement will form the subject of another application for Letters Patent.

We claim as our invention—

In machinery for turning stone, the combination, with a rest or holder, of two circular cutters free to revolve by contact with the revolving stone, and arranged opposite to and at an angle to each other and to the surface of the stone, substantially as and for the purpose hereinbefore described.

In testimony whereof we have signed our names to this specification in the presence of two subscribing witnesses.

JOHN DICKINSON BRUNTON.
FRANK HENRY JULIUS TRIER.

Witnesses to the signature of John Dickinson Brunton:
CHAS. MILLS,
JOHN JAMES,
*Both of 47 Lincoln's Inn Fields, London.*

Witnesses to the signature of Frank Henry Julius Trier, (commonly known as Frank Trier:)
F. ENGLERT,
FRANZ MÜLLER,
*Both of Mannheim.*